US008156539B1

(12) United States Patent
Nelson

(10) Patent No.: US 8,156,539 B1
(45) Date of Patent: Apr. 10, 2012

(54) METHOD AND SYSTEM FOR PROTECTING A WIRELESS NETWORK

(75) Inventor: Timothy E. Nelson, Eagle, ID (US)

(73) Assignee: Cypress Semiconductor Corporation, San Jose, CA (US)

(*) Notice: Subject to any disclaimer, the term of this patent is extended or adjusted under 35 U.S.C. 154(b) by 777 days.

(21) Appl. No.: 10/325,204

(22) Filed: Dec. 18, 2002

(51) Int. Cl.
*H04L 29/06* (2006.01)

(52) U.S. Cl. ......... 726/2; 726/3; 726/4; 726/22; 726/23; 726/26; 726/27; 455/456.1; 455/456.2; 455/456.3; 709/224; 709/225; 709/226

(58) Field of Classification Search ............... 455/456.1
See application file for complete search history.

(56) References Cited

U.S. PATENT DOCUMENTS

| | | | | |
|---|---|---|---|---|
| 5,583,517 | A * | 12/1996 | Yokev et al. | 342/457 |
| 5,710,885 | A * | 1/1998 | Bondi | 709/224 |
| 5,757,916 | A * | 5/1998 | MacDoran et al. | 380/258 |
| 6,140,964 | A * | 10/2000 | Sugiura et al. | 342/464 |
| 6,246,361 | B1 * | 6/2001 | Weill et al. | 342/357.01 |
| 6,353,412 | B1 * | 3/2002 | Soliman | 342/387 |
| 6,442,507 | B1 * | 8/2002 | Skidmore et al. | 702/186 |
| 6,603,412 | B2 * | 8/2003 | Gatherer et al. | 341/61 |
| 6,618,005 | B2 * | 9/2003 | Hannah et al. | 342/357.1 |
| 6,768,963 | B2 * | 7/2004 | Liberti et al. | 702/150 |
| 6,920,330 | B2 * | 7/2005 | Caronni et al. | 455/456.1 |
| 6,956,527 | B2 * | 10/2005 | Rogers et al. | 342/458 |
| 6,961,541 | B2 * | 11/2005 | Overy et al. | 455/41.2 |
| 6,987,744 | B2 * | 1/2006 | Harrington et al. | 370/328 |
| 7,006,019 | B2 * | 2/2006 | Lee et al. | 341/59 |
| 7,042,867 | B2 * | 5/2006 | Whitehill et al. | 370/338 |
| 7,299,059 | B2 * | 11/2007 | Misikangas et al. | 455/457 |
| 7,340,214 | B1 * | 3/2008 | Hamberg | 455/41.2 |
| 7,392,464 | B1 * | 6/2008 | Feng et al. | 714/809 |
| 7,409,220 | B2 * | 8/2008 | Belcea | 455/457 |
| 7,436,332 | B2 * | 10/2008 | Lakus-Becker | 341/59 |
| 7,486,208 | B2 * | 2/2009 | Cideciyan et al. | 341/58 |
| 7,741,967 | B2 * | 6/2010 | Valeriano et al. | 340/539.11 |
| 8,010,133 | B2 * | 8/2011 | Cheok et al. | 455/456.5 |
| 2002/0022483 | A1 * | 2/2002 | Thompson et al. | 455/439 |
| 2002/0102995 | A1 * | 8/2002 | Zelmanovich et al. | 455/456 |
| 2003/0023614 | A1 * | 1/2003 | Newstrom et al. | 707/104.1 |
| 2003/0144009 | A1 * | 7/2003 | Nowlin | 455/456 |
| 2003/0232598 | A1 * | 12/2003 | Aljadeff et al. | 455/41.2 |
| 2004/0053645 | A1 * | 3/2004 | Brignone et al. | 455/562.1 |
| 2004/0203748 | A1 * | 10/2004 | Kappes et al. | 455/432.1 |
| 2007/0049291 | A1 * | 3/2007 | Kim et al. | 455/456.1 |
| 2008/0032705 | A1 * | 2/2008 | Patel et al. | 455/456.1 |
| 2009/0117916 | A1 * | 5/2009 | Jo | 455/456.1 |
| 2010/0105409 | A1 * | 4/2010 | Agarwal et al. | 455/456.1 |

OTHER PUBLICATIONS

P. Bahl and V. N. Padmanabhan, "Radar: An in-building rf-based user location and tracking system," In Proceedings of the IEEE Infocom 2000, Tel-Aviv, Israel, vol. 2, Mar. 2000, pp. 775-784. http://citeseer.ist.psu.edu/bahl00radar.html.*

(Continued)

*Primary Examiner* — Syed A. Zia

(57) ABSTRACT

A method and system for protecting a wireless network by establishing virtual walls to confine wireless connection to devices located within a three-dimensional region. A network of wireless monitoring nodes is established at physical locations. The monitoring nodes are arranged in a frame of reference and determine locations of one another and of mobile nodes by conducting measurements of either roundtrip travel time of signals sent and received or of differences in the times of receiving a signal at different known locations. Initially mobile nodes are placed, sequentially, in a triangle at a boundary to be established as a virtual wall for confining communication within the wireless network. The mobile node locations are then stored. The position of a device requesting admission to the wireless network is similarly determined and, if within the established virtual walls, the device may be admitted to the network. Admission is otherwise denied.

19 Claims, 11 Drawing Sheets

OTHER PUBLICATIONS

Bahl, P., Balachandran, A., Padmanabhan, V. N., "Enhancements to the Radar User Location and Tracking System," Microsoft Research Technical Report, Feb. 2000. http://citeseer.ist.psu.edu/bahl00enhancements.html.*

Dorothy E. Denning and Peter F. MacDoran, "Location-based authentication: Grounding cyberspace for better security", Computer Fraud & Security, vol. 1996, Issue 2, Feb. 1996, pp. 12-16.*

Ward et al., "A New Location Technique for the ActiveOffice", IEEE Personal Communications, Oct. 1997, pp. 42-47.*

* cited by examiner

METHOD AND SYSTEM FOR PROTECTING A WIRELESS NETWORK

BACKGROUND OF THE INVENTION

1. Field of the Invention

The present invention relates to the field of security for computer network systems. Specifically, the present invention relates to establishing boundaries for limiting communication within a wireless computer network.

2. Related Art

Continued advancements in hardware technology and software development are enabling computer systems and other electronic devices, such as personal digital assistants, laptop computers, electronic books, cellular phones, etc., to be utilized in a variety of different implementations and applications. Some implementations are financial and commercial transactions, computer-aided design, communication, data storage and warehousing, education, etc. Additionally, coupling stand-alone computers and other electronic devices to form a networking environment greatly enhances their functionality. In a network environment, users are able to exchange information, share commonly stored files, combine resources, and communicate via e-mail (electronic mail) and via video conferencing. Further, with the advent of wireless communication, networked computers can communicate and exchange information with nearly any other computer or other electronic device without having to be physically connected via a wired configuration.

In a wireless environment, there is a wireless client and an access point. The communication between the client and the access point is in the form of electromagnetic (em) radiation that is transmitted over public air space, so the communication is visible to anyone within range. As illustrated in FIG. 1, the information 20 transmitted via this em radiation spills outside of the building 10, through windows, doors and through most wall materials. In order to protect the privacy and contents of the transmitted communication from intrusion, the information is commonly encrypted. To enable encryption, an encryption key may be distributed to each of the clients utilizing the wireless network.

It is important to assure that the client device is approved to receive an encryption key for a particular network and, conversely, that the network is approved for that particular client. It is also important that the user of the device also be approved for communication over the network. Therefore some form of authentication protocol must be employed in order to authenticate the devices, the network and the user.

There are a number of ways for a network to verify user identity in order to check whether it should grant access to its resources. For local area networks, the IEEE draft standard 802.1x/D11 specifies how to accomplish this. It establishes a basis for carrying authentication information from a supplicant to an authenticator, and optionally from the authenticator to an authentication server, in order to control access to the network by users. FIG. 2 illustrates a hardware block technique as specified in IEEE 802.1x/D11. When a client device 120 first connects to the network, the client device 120 is only allowed to communicate with the authentication server 110. A hardware switch 130 prevents the client device 120 from accessing the full network 140. After the client device 120 authenticates with the authentication server 110, the hardware switch 130 allows the client device 120 to have access to the network 140.

Most network environments have firewalls to prevent unauthorized users from having direct access to the network from outside the network. The firewall may be implemented in software on a computer, in a router, in a stand-alone firewall box, etc. The network may also have a Virtual Private Network (VPN) gateway. VPNs employ the security of a private network via access control and encryption. All traffic from the Internet may be directed through a firewall or a VPN gateway, thus providing a certain measure of protection for that path.

In comparison to wireline networks, wireless networks have an additional problem to solve when users attempt to connect to them. Generally, wireline networks rely on protected distribution systems (e.g., conduit protected cabling, switches in locked wiring closets) to ensure the traffic they carry is not intercepted or modified in an unauthorized way. Wireless networks, on the other hand, communicate over publically accessible radio channels. Consequently, they must provide other means for protecting their traffic. Generally, this requires wireless networking devices to encrypt and integrity-protect the traffic between them.

Several previous schemes have addressed the problem of user authentication, authorization and key distribution in wireless local area networks. In one scheme, a user and the network mutually authenticate using a shared secret, generally a password. A complimentary scheme utilizes a secret shared by the user and a network to create an encryption key that can then be used to protect the confidentiality and integrity of the traffic between the user's wireless device and the network. The use of these two schemes has the advantage of securely authenticating the user and creating the encryption key.

These schemes, and other conventional methods of moderating network access, are problematic for at least two major reasons. In the first place, requiring authentication procedure compliance to gain network access is not fool proof. "Spoofing," e.g., faking the sending address of a data transmission in order to authenticate without authorization, if successful, may expose even a seemingly secure network to intrusion Further, the "seemingly secure" nature of the network in such an instance weaves an obviously false sense of security. This false sense of security has its own risks, because great amounts of mischief may occur under its camouflage. Such mischief may perhaps occur in a manner and on an order unlikely in a patently non-secure system, wherein network participants would more probably know to take appropriate precautions.

Secondly, conventional methods of detecting intrusion into secured networks typically seek effects caused by the presence of unauthorized entities and/or actions taken by unauthorized entities that have gained access thereto. In many cases this amounts to nothing more than internal damage assessment. It therefore provides no ability to prevent the intrusion or resultant damage, or even to detect such intrusion in real time or near-real time.

However, in as much as such intrusions and other security breaches enabled by such spoofing continue to be problematic to networking and costly to users of networks, countermeasures to such schemes are sought. Such countermeasures should be capable of implementation without gross revamping of network architecture or burdening network accessibility to legitimate authorized entities.

SUMMARY OF THE INVENTION

Accordingly, embodiments of the present invention provide a method, system and device for protecting a wireless network by establishing virtual walls to confine wireless connection to devices located within a three-dimensional region. These embodiments provide countermeasures to spoofing and other similar forms of intrusion into a wireless network without gross revamping of network architecture or heavily burdening network accessibility to legitimate authorized entities by confining wireless network accessibility to the confines of a physical structure.

In one embodiment of the present invention, a frame of reference is formed by establishing a region delineated by a plurality of nodes that are operable to send and receive wireless signals. An embodiment of the present invention derives boundaries for the wireless network approximating a physical structure in which the wireless network is housed. In response to a wireless device seeking access to the network, each of the plurality of nodes sends a ping signal and receives a response signal to determine the location of the wireless device. Then, it is determined if the wireless device is within the boundaries based on the frame of reference and the determined location of the wireless device.

An embodiment of the present invention establishes the frame of reference region by measuring distances between each of the plurality of nodes, based on roundtrip time of the wireless signals sent and received by the plurality of nodes, and storing the distances in a memory location. In establishing the region, known delays are subtracted from the roundtrip time of the wireless signals.

In one embodiment the determination of whether the wireless device is within the boundaries is made by determining regions in which the wireless device is possibly located based on distances to the wireless device, determined from a time between the sending of the ping signal and the receipt of the response signal. A position of the wireless device is then determined by forming an intersection of the regions.

In one embodiment the determination of whether the wireless device is within the boundaries is made by determining a difference in arrival times of the response signal at each of the nodes to determine a 3-space location of the wireless device with respect to the frame of reference.

In one embodiment, deriving boundaries includes measuring distances from the plurality of nodes to a plurality of positions of a mobile node based on roundtrip times of signals sent to and received from the plurality of positions, and storing coordinates of a plurality of intersecting planes, the plurality of intersecting planes determined from the measured distances. Determining if the wireless device is within the boundaries based on the frame of reference and the determined distances to the wireless device may, according to one embodiment, include determining a plurality of regions in which the wireless device is possibly located, based on the distances, and determining a coordinate for the wireless device by forming an intersection of the pluralities of regions.

In one embodiment, the plurality of positions forms a triangle, the triangle determining one of the plurality of planes. According to one embodiment, determining if the wireless device is within the boundaries includes establishing coordinates of a location in space of the wireless device and comparing the coordinates of the location to the coordinates of the plurality of intersecting planes. According to one embodiment, the wireless device is admitted to the wireless network when the wireless device is within the boundaries.

In one embodiment, monitoring nodes in a wireless network security system are configured to send and receive ping signals. A frame of reference comprising an orientation of the monitoring nodes is established and a plurality of virtual walls is then established by combining physical length measurements from a plurality of positions in the frame of reference to a plurality of positions of a mobile node.

One embodiment of the present invention is a wireless network security device having logic operable to send and receive ping signals, and having logic operable to establish a sphere of operation for a wireless network comprising a radius that is defined by a predetermined parameter for a measured roundtrip signal response time of the ping signals, corrected for known time delays. The device also has logic operable to determine if a wireless device seeking admission to the wireless network is within the sphere of operation by measuring signal response time to and from the wireless device and correcting for a known time delay parameter of the wireless device. According to one embodiment, the wireless security device includes logic operable to recognize the hardware of the wireless device seeking admission and to determine the known time delay parameter.

BRIEF DESCRIPTION OF THE DRAWINGS

The accompanying drawings, which are incorporated in and form a part of this specification, illustrate embodiments of the invention.

DETAILED DESCRIPTION OF THE EMBODIMENTS

In the following detailed description of the embodiments, numerous specific details are set forth in order to provide a thorough understanding of the present invention. However, it will be recognized by one skilled in the art that the present invention may be practiced without some specific details or with equivalents thereof. In other instances, well-known methods, procedures, components, and circuits have not been described in detail as not to unnecessarily obscure aspects of the embodiments.

Exemplary Computer System

Figure 1:
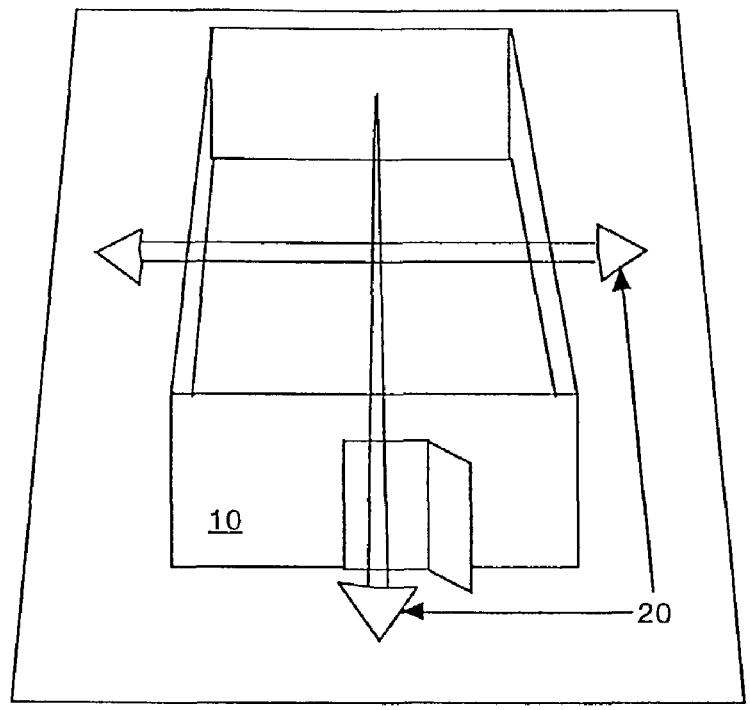
FIG. 1 is a diagram illustrating spillover of wireless communication signals in accordance with conventional art.
Figure 2:
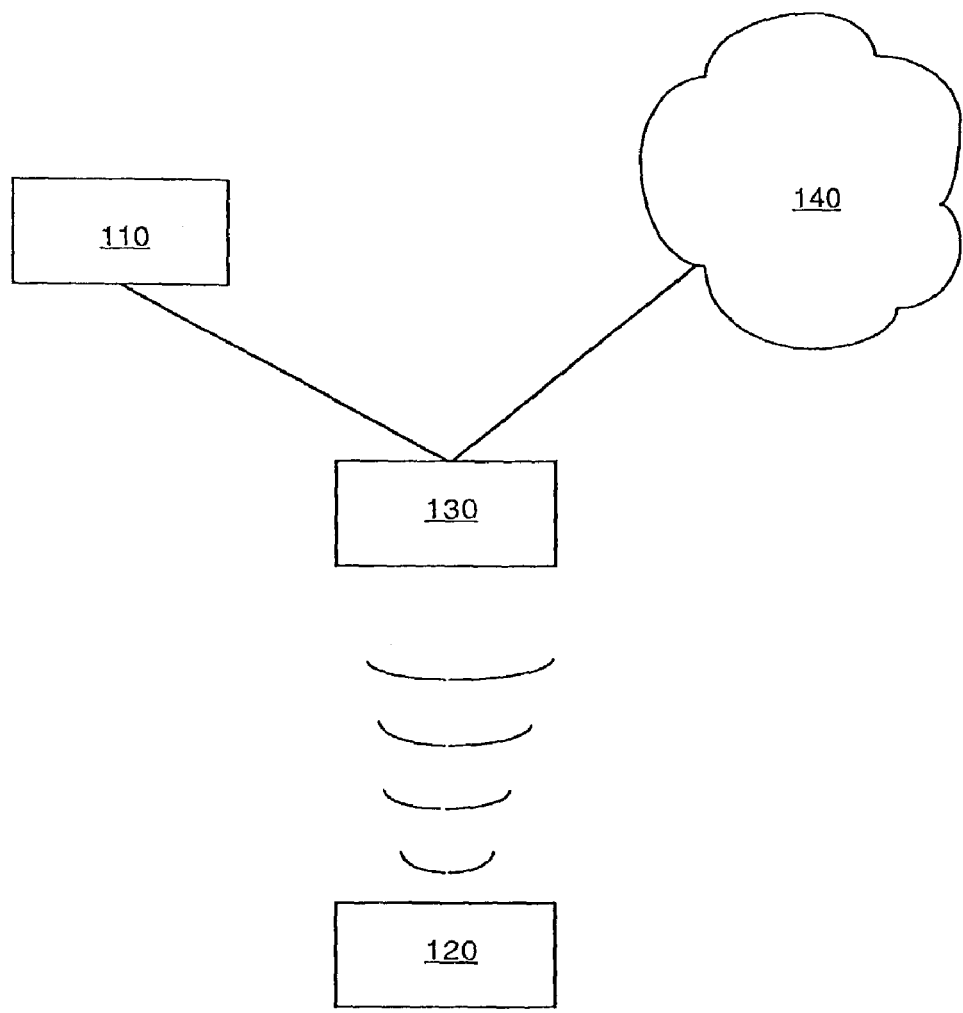
FIG. 2 is a diagram illustrating a conventional technique to provide security for a network using a physical switch, according to conventional art.
Figure 3:
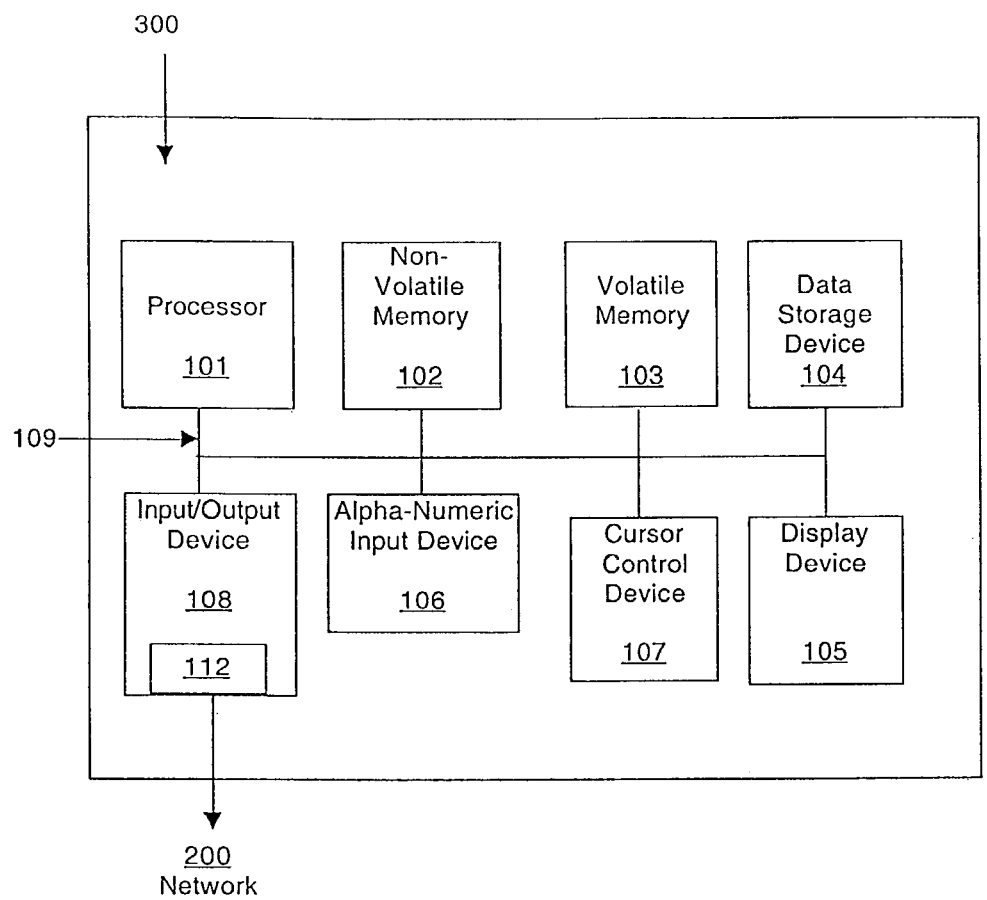
FIG. 3 is a block diagram of an exemplary computer system upon which embodiments of the present invention may be practiced.

With reference to FIG. 3, portions of the present invention are comprised of computer-readable and computer executable instructions which reside, for example, in computer-readable media of an electronic system such as a computer system. FIG. 3 illustrates an exemplary electronic device 300 upon which embodiments of the present invention may be practiced. It should be appreciated that electronic device 300 of FIG. 3 is an exemplary representation of a number of different computer systems and electronic devices in which the present invention can operate, including but not limited to desktop computers, laptop computers, and PDAs (personal digital assistants).

Electronic device 300 includes an address/data bus 109 for communicating information, a processor 101 coupled with bus 109 for processing information and instructions, a non-volatile memory (ROM—read only memory) 102 coupled with bus 109 for storing static information and instructions for processor 101, and a volatile memory (RAM—random access memory) 103 coupled with bus 109 for storing information and instructions for the processor 101. Electronic device 300 also includes data storage device 104 such as a magnetic or optical disk and disk drive coupled with bus 109 for storing information and instructions. Data storage device 104 can include one or more removable magnetic or optical storage media, e.g., diskettes, tapes, SD (secure digital) cards, MMC (multi-media cards), which are computer readable memories. Memory units of electronic device 100 include volatile memory 102, non-volatile memory 103, and data storage device 104.

Electronic device 300 of FIG. 3 also includes an input/output device 108 which is coupled to bus 109 for providing a physical communication link between electronic device 100 and a network 200. As such, input/output device 108 enables central processor unit 101 to communicate with other electronic systems coupled to the network 200. It should be appreciated that within the present embodiment, input/output device 108 provides the functionality to transmit and receive information over a wired as well as a wireless communication interface (such as a Bluetooth or IEEE 802.11b interface). Input/output device 108 includes dedicated hardware 112 for returning wireless ping signals to an initiating device with a predefined fixed delay time.

Electronic device 300 may also include an optional alphanumeric input device 106 that includes alphanumeric and function keys coupled with bus 109 for communicating information and command selections to processor 101. An optional display device 105 can be coupled with bus 109 for displaying information to a computer user. Display device 105 may be a liquid crystal display (LCD), a cathode ray tube (CRT), another flat panel display, an electronic paper display, or other display device suitable for creating graphic images and alphanumeric characters recognizable to a user.

Electronic device 300 also includes an optional cursor control for directing device 107 coupled with bus 109 for communicating user input information and command selections to processor 101. Cursor control device 107 allows the user to dynamically signal the two dimensional movement of a visible symbol (cursor) on a display screen of display device 105. Many implementations of cursor control device 107 and know in the art including a trackball, mouse, touch pad, touch screen, or special keys on alphanumeric input device 106 capable of signaling movement of a given direction or manner of displacement. Alternatively, it is appreciated that a cursor can be directed and/or activated via input from alphanumeric input device 106 using special keys and/or key sequence commands.

Figure 4:
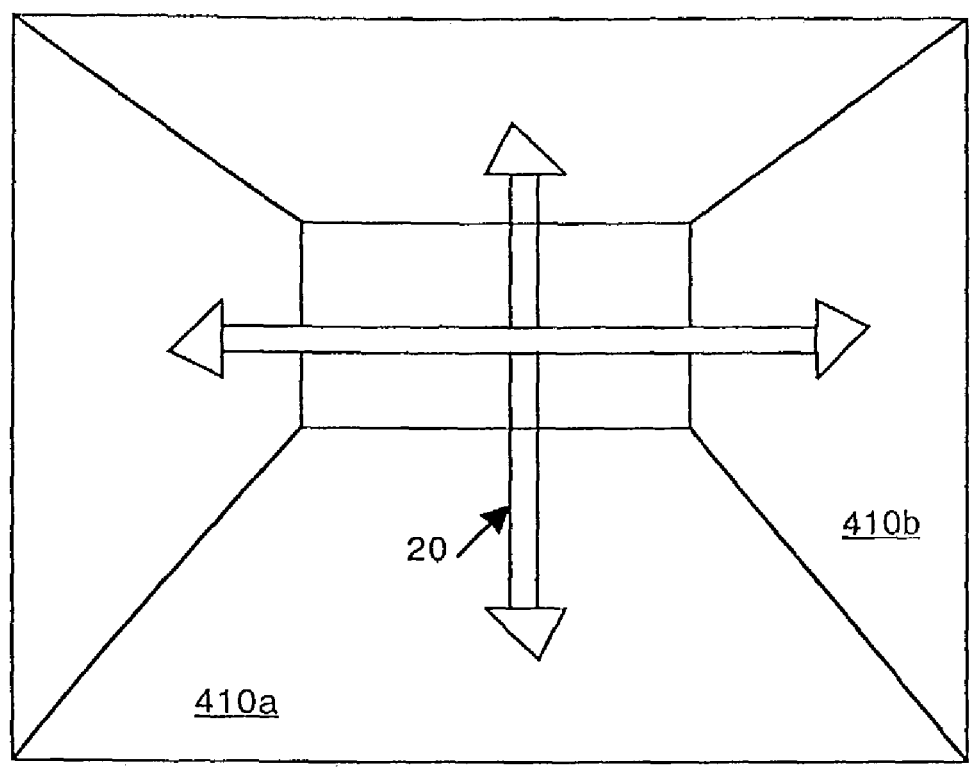
FIG. 4 is a diagram illustrating virtual walls that may be established around a wireless network, according to one embodiment.

FIG. 4 is a diagram 400 illustrating virtual walls that may be established around a wireless network, according to one embodiment. Businesses already have physical walls, key-card-operated doors, badges and security personnel, etc., that define private territories where unauthorized persons are not allowed access. Virtual walls such as 410a and 410b of FIG. 4 may be established around a wireless network that create boundaries to protect the network from outside intrusion. In such an environment, certain signals originating from wireless devices within established boundaries, such as signal 20 of FIG. 4, may be limited to the established boundaries. Details of the establishment of virtual walls as boundaries and authentication of a wireless device seeking entry into the wireless network are covered in the following figures.

Figure 5:
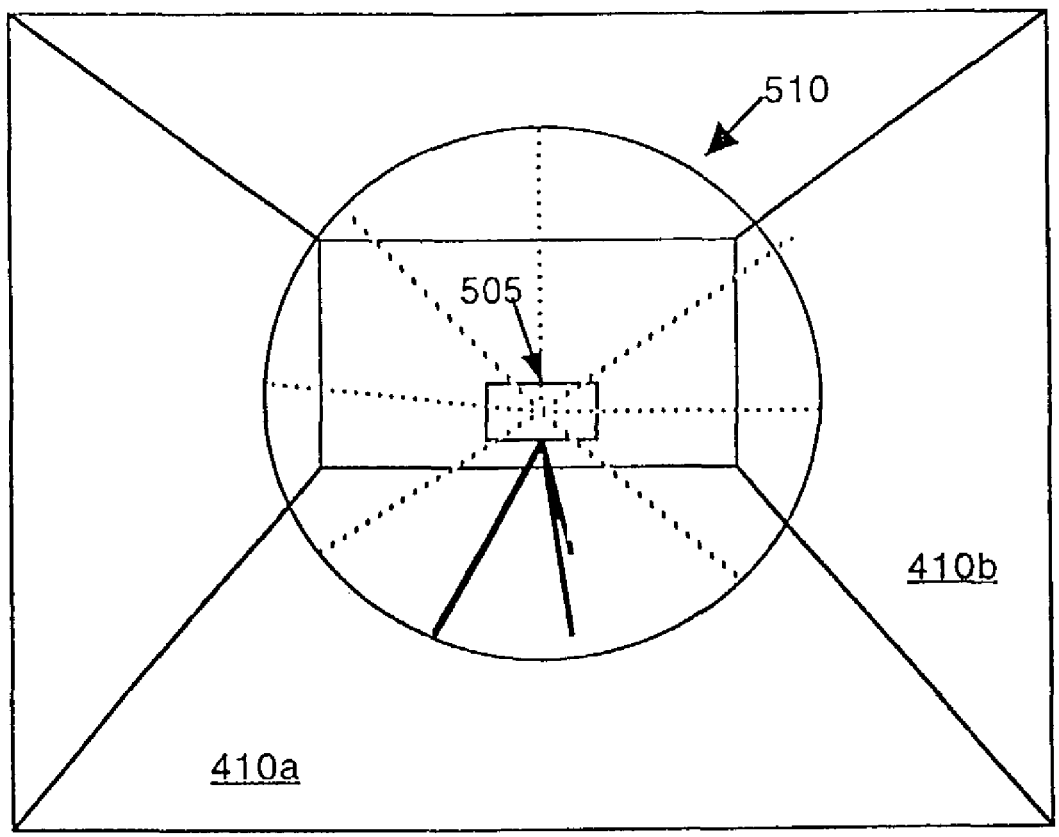
FIG. 5 is a diagram illustrating a wireless network security device with spherical boundaries, in accordance with one embodiment.

FIG. 5 is a diagram 500 illustrating a wireless network security device 505 with spherical boundaries 510 in accordance with one embodiment. This spherical model represents the simplest example of virtual walls. In this embodiment device 505 may be a computing device (e.g., computer 300 of FIG. 3), configured to send, receive and process wireless signals. Device 505 may be centrally located within the physical walls to which the network is to be limited, and device 505 may deny access to a wireless network to any device lying outside spherical boundaries 510.

According to one embodiment, device 505 sends a signal such as a ping signal to a wireless device that is requesting entry to a wireless network (e.g., network 200 of FIG. 3) and measures the roundtrip delay time from the sending of the ping signal until a returned signal is received from the requesting device. The device requesting entry to network 200, according to one embodiment, contains hardware with a known response-delay time. Device 505 measures the time between the originating ping signal that it sent and the receipt of a returned signal from the requesting device and subtracts out the known delays. If the resulting roundtrip time is greater than a specified threshold, the requesting device is denied access to the network. If the resulting roundtrip time is less than or equal to the threshold, access to the network may be granted provided any other specified protocol is also met.

Figure 6:
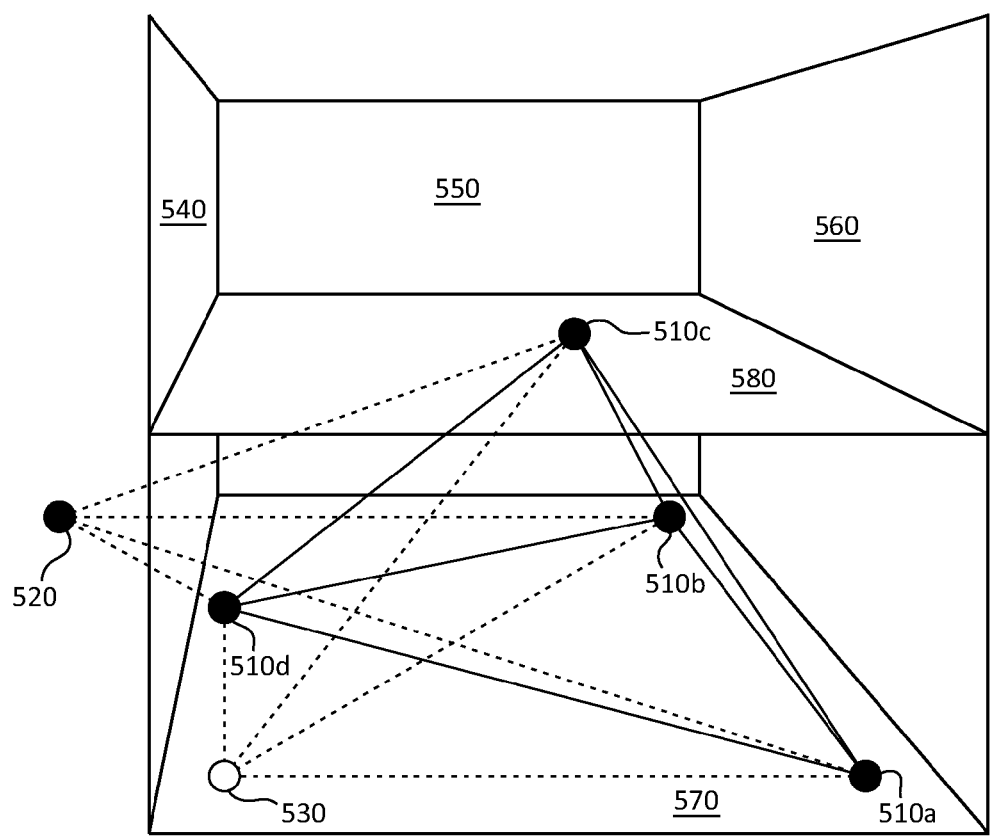
FIG. 6 is a diagram illustrating the placement of nodes to establish a geometric frame of reference in accordance with one embodiment.

FIG. 6 is a diagram illustrating the placement of nodes to establish a geometric frame of reference in accordance with one embodiment. Since few people work in buildings that are spherically shaped, the security device 505 of FIG. 5 may have limited applications. FIG. 6 illustrates a concept for establishing fixed virtual two-dimensional surfaces that exist in the three-dimensional physical environment of a network. These virtual surfaces, e.g., surfaces 540, 550 and 560 of FIG. 6, provide intersecting boundaries that can match the physical space occupied by the people and devices that utilize the network. To provide this ability, a minimum of four nodes with physically fixed locations, e.g., nodes 510a, 510b, 510c and 510d, may be utilized, according to one embodiment, for a multi-story building. It should be appreciated that a single story building may, however, be able to use a three-node arrangement in one embodiment. These nodes may be one of many types of computational devices having a processor and a wireless signal transceiver with known signal response/delay times (e.g., computer 300 and transceiver 112 of FIG. 3).

In addition, it is understood that a multi-story building in which two floors were required to support a wireless network might also be able to use a three-node arrangement. For example, suppose there are three fixed reference nodes (e.g., 510a, 510b and 510d) located at the bottom of the $5^{th}$ floor. These nodes provide wireless networking to the $4^{th}$ and $5^{th}$ floors while preventing unauthorized access by the $3^{rd}$ and $6^{th}$ floors (and all other floors).

For purposes of discussion, a multi-story example with a minimum of four nodes will be used, as illustrated in FIG. 6. To set up a network secured by virtual boundaries, a geometric frame of reference may be established. In one embodiment where four nodes are used, a tetrahedral reference may be established with each of four monitoring nodes 510a, 510b, 510c and 510d at a vertex. Three of the nodes may be in a triangular arrangement on one floor and the fourth may be on the ceiling of a single story, or somewhere on the top floor of a multi-story building. Monitoring nodes 510a, 510b, 510c and 510d may establish their relative positions in three-space by measuring the lengths of edges 590a, 590b, 590c, 590d, 590e and 590f of the tetrahedron they form. This may be accomplished, according to one embodiment, by sending out and receiving ping signals to one another and measuring the roundtrip signal time, subtracting out known delay times. These relative positions, the length of the sides of the tetrahedron, may then be stored in memory for future reference. In one embodiment, coordinates of the monitoring nodes are established by each of the monitoring nodes determining a region in which a given monitoring node may be located. The given monitoring node's exact coordinate may be determined by forming an intersection of the regions.

In one embodiment, a redundant node may be used to assist with the establishment of coordinates for monitoring nodes 510a-d. The position information may be stored in each of the monitoring nodes 510a-d in one embodiment or, in another embodiment, one of the monitoring nodes may function as a master, storing all of the measurements and making them available to the other nodes as needed. A master node may, according to one embodiment, determine admission into the network for a requesting device. The master node may also, in one embodiment, perform calculations and direct the other nodes to perform functions, e.g., sending ping signals and receiving responses.

Any time a new device, such as device 530 or 520 of FIG. 6, requests admission to the network or has its location verified, monitoring nodes 510a, 510b, 510c and 510d actively send a ping signal to requesting device 530 or 520 and await a return signal from device 530 or 520. Monitoring nodes 510a, 510b, 510c and 510d may send their respective ping signals sequentially, e.g., at the direction of the master node. The time between the sending of the initiating signal and the receipt of the return signal is modified by known delays and translated into a distance according to one embodiment. From this distance, and the utilization of the frame of reference that is a tetrahedron defined by monitoring nodes 510a, 510b, 510c and 510d, the location of the requesting device may be measured.

Still referring to FIG. 6, device 530 is shown inside of virtual boundaries 540, 550, 560, 570, and 580 and device 520 is shown outside the virtual boundaries 540, 550, 560, 570, and 580. It should be understood that virtual boundaries are not necessarily closed on all sides. The virtual boundaries only serve to limit admittance to a network in so far as there is a sufficient number of nodes in adequate locations. For example, in a single story building or two adjacent floors of a multi-story building a triangular frame of reference may be used, according to one embodiment. In such an instance, nodes 510a, 510b and 510d may be used for a frame of reference.

Figure 7:
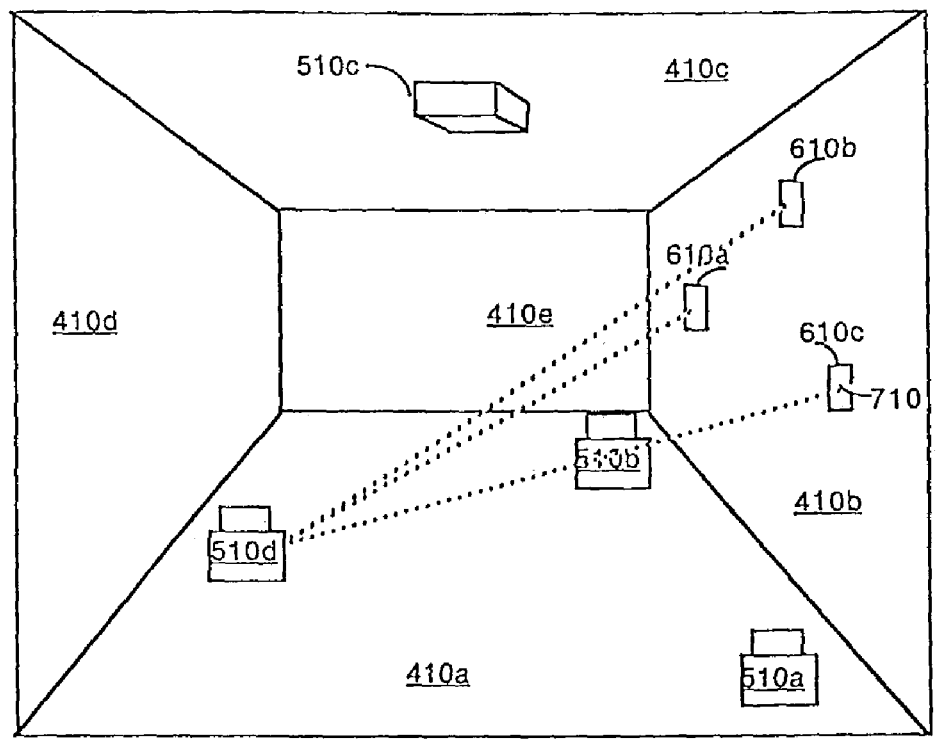
FIG. 7 is a diagram illustrating the establishment of virtual walls according to one embodiment.

FIG. 7 is a diagram illustrating the establishment of virtual walls according to one embodiment. Once monitoring nodes (e.g., 510a-d of FIG. 6) are located in physically fixed locations and their relative positions are established as a geometric frame of reference, virtual boundaries or walls may be established to align closely with the physical structure of the building within which a wireless network is to be secured. Diagram 700 of FIG. 7, in conjunction with flow diagram 800 of FIG. 8, illustrates the establishment of virtual walls in accordance with one embodiment of the present invention.

Although specific steps are disclosed in flow diagram 800, such steps are exemplary. That is, the present invention is well suited to performing various other steps or variations of the steps recited in FIG. 8.

Figure 8:
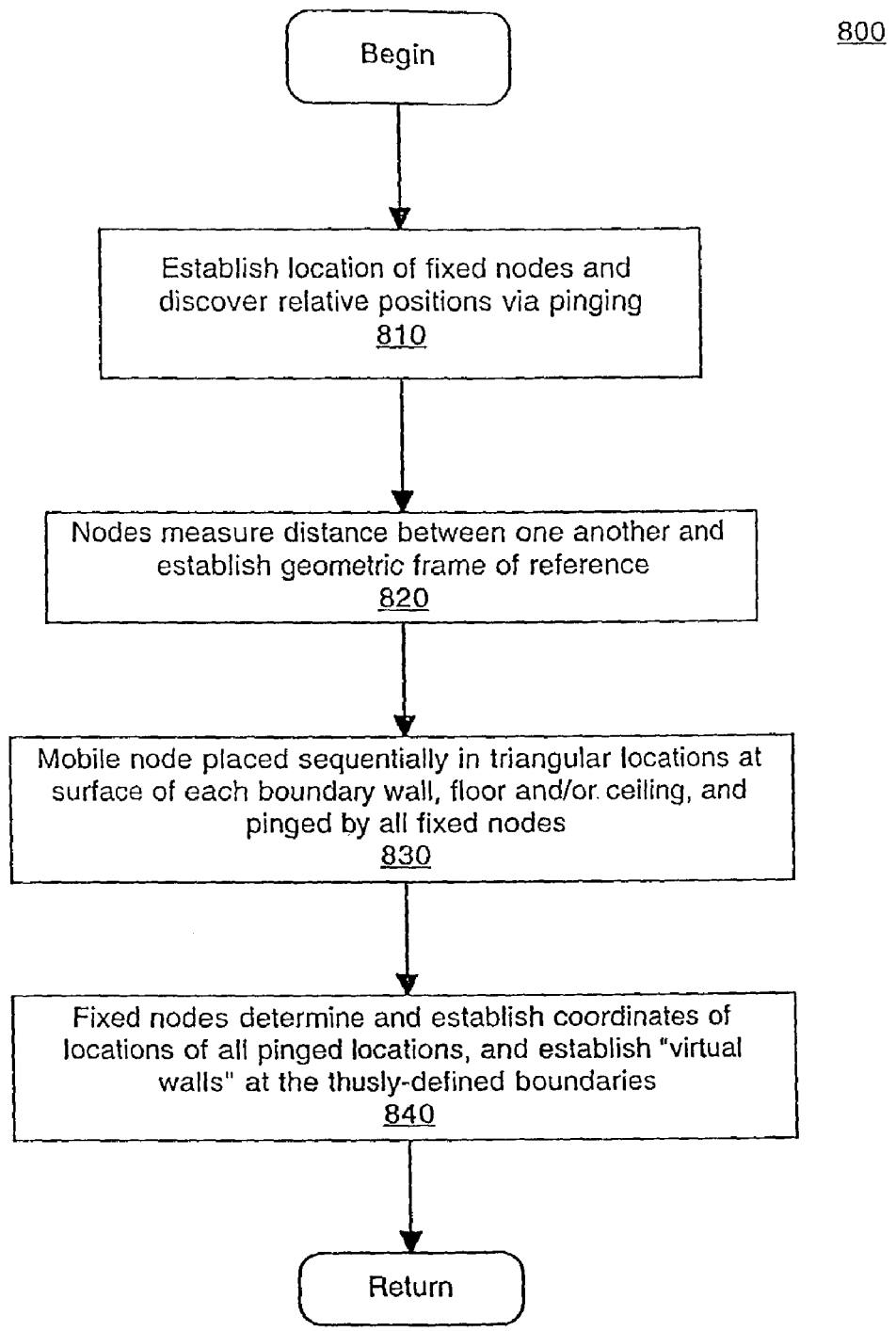
FIG. 8 is a flow diagram of a method for establishing virtual walls according to one embodiment.

In step 810 of flow diagram 800 of FIG. 8, the establishment of the location of monitoring nodes (e.g., 510a-d) and discovering relative positions by pinging may be accomplished as described in one embodiment in conjunction with FIG. 6. The monitoring nodes 510a-d may be network servers, desktop computers, laptop computers, personal digital assistants, uniquely designed devices, or any of a variety of devices having a processor, a memory and a wireless signal transmitter and receiver (e.g., computer 300 of FIG. 3). It should understood that the positions of the monitoring nodes 510a-d are "fixed" at the time of determining a frame of reference, but, due to the nature of the monitoring nodes 510a-d, monitoring nodes 510a-d may re-establish their relative positions whenever one of monitoring nodes 510a-d moved. In one embodiment a redundant node may be used to assist with re-establishing the positions. In an embodiment having greater than three nodes in a frame of reference, the nodes may be placed most anywhere as long as they define a three dimensional space. In other words, one node should be in a plane that may be different than that of the other nodes.

Still referring to FIGS. 7 and 8, in step 820 of FIG. 8 a geometric frame of reference may be established by measuring the distance between each of monitoring nodes 510a-d. This distance may be measured based on roundtrip travel time for the sending of a signal and the receipt of a response signal, allowing for known delays, with a known signal velocity. FIG. 7 illustrates an arrangement, in accordance with one embodiment, of four nodes, nodes 510a, 510b, 510c and 510d. With four nodes a tetrahedral frame of reference may be established as shown in FIG. 6. In one embodiment, nodes 510a, 510b and 510d may be used to establish a triangular frame of reference.

In step 830 of FIG. 8, to establish the virtual walls or boundaries that may corresponding approximately to the physical walls of the building, a mobile node 710 may be placed sequentially in triangular locations (e.g., locations 610a, 610b and 610c of FIG. 7) at the surface of each physical boundary wall 410b, 410d, 410e, (missing wall through which FIG. 7 is viewed), floor 410a and/or ceiling 410c. Mobile nodes 610a-c may be any of a variety of devices with signal transmitters and receivers. Mobile nodes 610a-c may be, for example, any combination of portable computers, PDA devices, or simple transceiver devices with a known response-time delay for returning a received signal. In one embodiment mobile nodes 610a-c are transceiver devices that have a push button 710 for sending a signal to activate monitoring nodes 510a-d to send ping signals to locate them. Each of the mobile locations 610a-c may be pinged by all of the monitoring nodes 510a-d and, as illustrated at step 840, the measured distance may be stored in memory at each of the monitoring nodes and/or at the master node. In one embodiment, given six physical boundary walls, each of the monitoring nodes 510a-d and/or the master node may store 18 distances defining the planes of each of six virtual boundaries. In one embodiment 108 distances may be stored, defining each of the six virtual boundaries relative to all four monitoring nodes 510a-d.

It may be appreciated that the number of monitoring nodes (e.g., 510a-d) and the number of boundary walls (e.g., 410a-e) of the embodiments may exist in a wide variety of configurations. For example, in one embodiment the building may be a single story, multi-sided structure in which three monitoring nodes are employed for a triangular frame of reference, each node measuring three triangular locations of a mobile node on each of the walls. In another embodiment the building may be multi storied with an el-wing in which case it might be better accommodated by five or more monitoring nodes and an affiliated polyhedral frame of reference.

It is also appreciated that the position of the monitoring nodes 510a-d may be subject to occasional change. At such time as a monitoring node's position changes, it may become necessary to re-establish the reference to the virtual walls. To accommodate a method for re-establishing the virtual walls without employing mobile nodes 610a-c, it may be prudent to have additional, redundant node(s). In one embodiment, if a monitoring node is detected as having moved, it may then be dropped from the frame of reference and a redundant node substituted. In another embodiment, after moving a monitoring node it may be possible to continue monitoring by calculating the new position of the monitoring node relative the virtual walls or to other nodes. Otherwise, upon moving a node, the mobile node may be used once more to re-establish the virtual walls as described above in conjunction with FIGS. 7 and 8.

In one embodiment, devices connected to the network may be identified to the network as being relatively static devices (e.g., desktop computers or network servers) or frequently mobile devices (e.g., PDAs or laptop computers). A device identified as relatively static may then be employed as an additional node for the frame of reference when needed.

In one embodiment, the geometry of the physical structure may be input to a master node or nodes in lieu of measuring three locations at each wall surface. The coordinates of the locations of the monitoring nodes within the structure may be defined so as to establish a frame of reference with the geometry of the physical structure forming the virtual walls. In this embodiment, if a monitoring node is moved, its location relative to the other monitoring nodes may be once again determined by pinging and its coordinates may then be updated relative to the physical structure.

Figure 9:
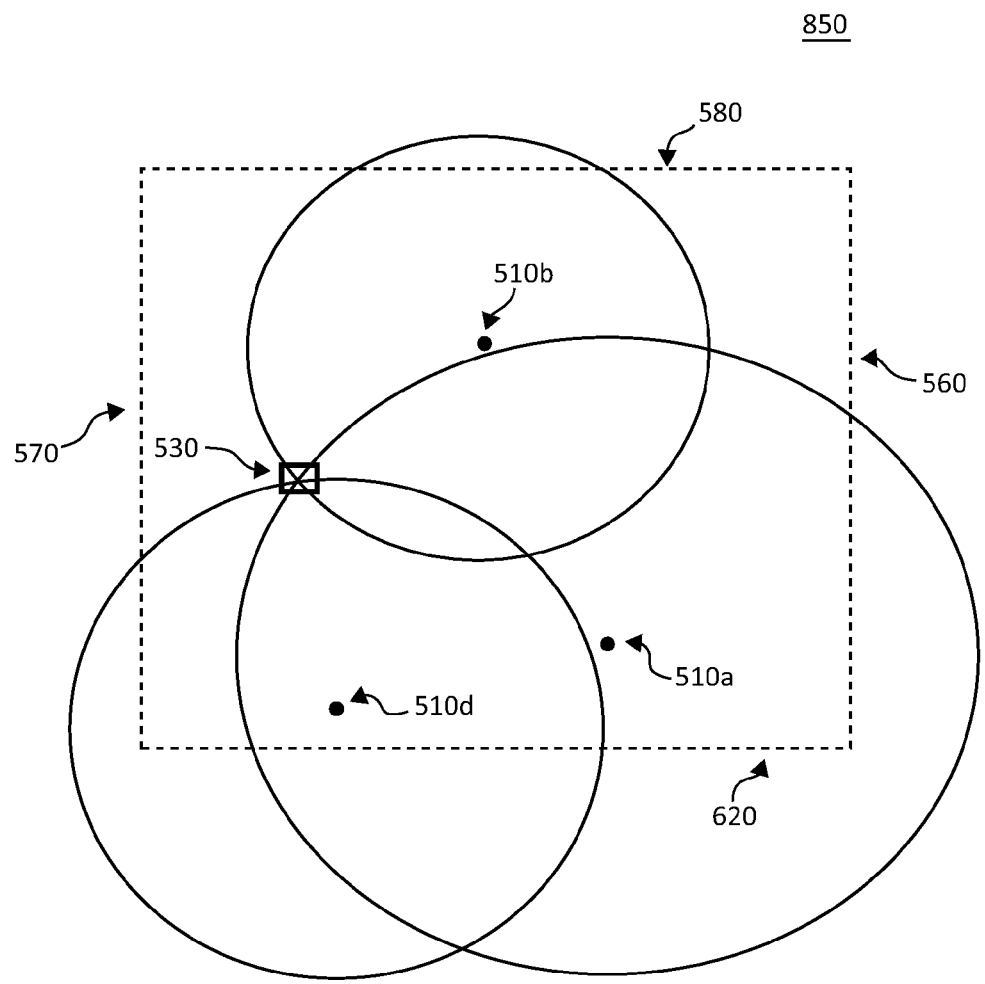
FIG. 9 is a diagram illustrating locating a wireless device seeking network access in accordance with one embodiment.

FIG. 9 is a diagram 850 illustrating the locating of a wireless device 530 seeking network access in accordance with one embodiment. The location of new device 530 may be uniquely determined in two-dimensional space based on the intersection of possible locations as determined by three monitoring nodes 510a, 510b and 510d. Possible locations may be determined based on a radius defined by a measured roundtrip signal time from each monitoring node 510a, 510b and 510d to the new device 530. A fourth node (e.g., node 510c of FIG. 6) would allow the location of device 530 to be uniquely determined in three-dimensional space. Once device 530 is located, its position may be determined relative to the established virtual walls 560, 580, 570 and 620 of the wireless network. Flow diagram 900 of FIG. 10, in conjunction with FIG. 9, defines a method for protecting a wireless network from unauthorized devices in accordance with one embodiment.

Although specific steps are disclosed in flow diagram 900, such steps are exemplary. That is, the present invention may be well suited to performing various other steps or variations of the steps recited in FIG. 10. Once the virtual walls are established within a physical structure, they may be used to confine a wireless network to the space within the virtual walls (e.g., virtual walls 560, 580, 570 and 620 of FIG. 9). Flow diagram 900 is explained in conjunction with FIG. 9 and, as such, is described in terms of a two-dimensional space. It should be appreciated that a fourth monitoring node, such as node 510c of FIG. 5, may be employed to locate wireless device 530 in three-dimensional space. It should also be appreciated that additional node(s) may be used, either to add redundancy or to better define a three-dimensional space. In step 910 a device (e.g., device 530 of FIG. 9) requests admission to a network or a predefined time interval occurs.

If device 530 of FIG. 9 is just entering the area or just being activated, it may request access to a network. Also, if device 530 is operating with access to the network, it may, at any time, exit the building to which access to the network is being confined. When exiting, the network connection may be terminated if the network security system is aware of the departure. Thus, a predefined time period may be specified to the system for checking the location of all connected devices.

Figure 10:
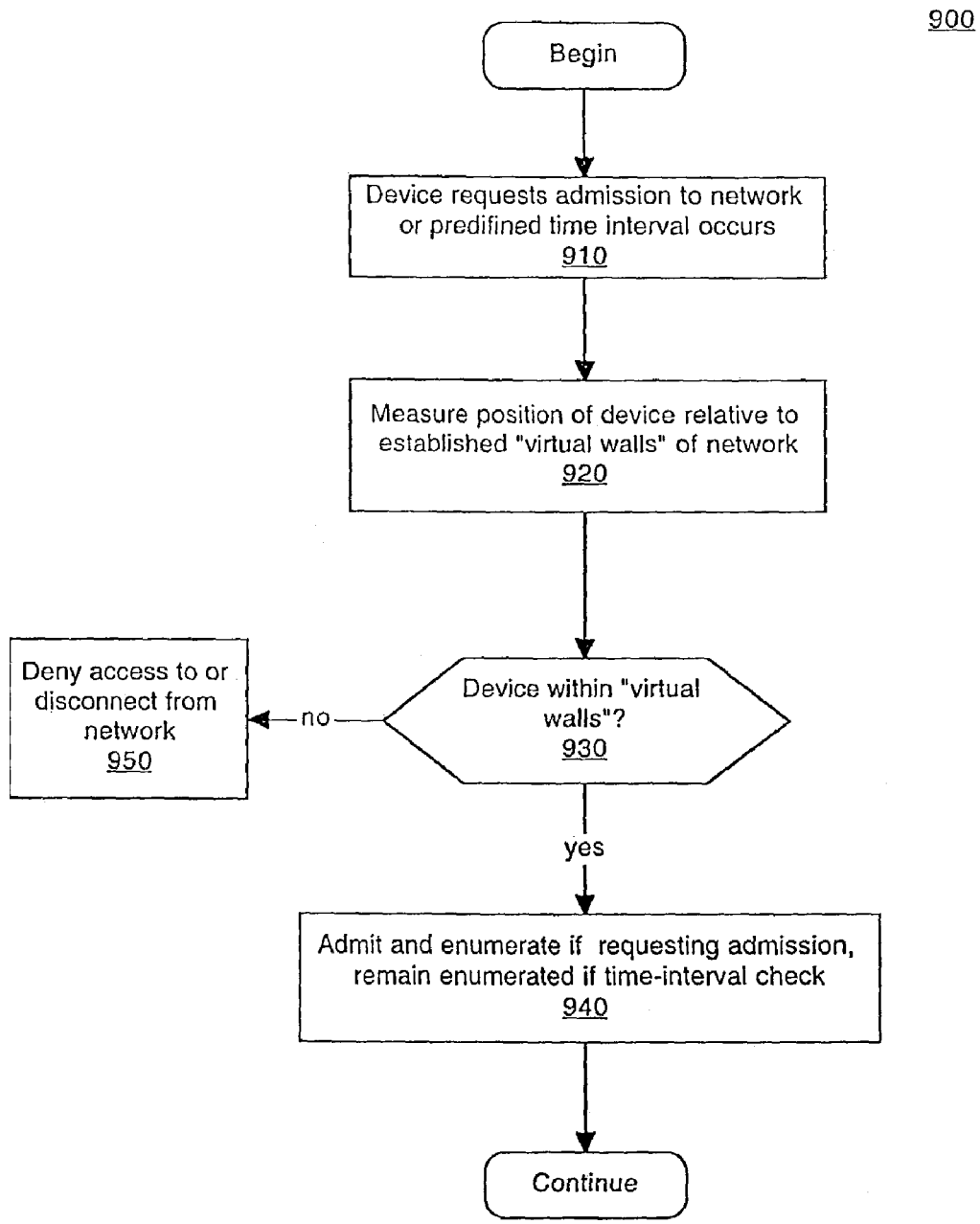
FIG. 10 is a flow diagram of a method for protecting a wireless network from unauthorized devices in accordance with one embodiment.

At step 920 of FIG. 10, the position of any connected device (e.g. device 530 of FIG. 9) may be measured by pinging the device by all monitoring nodes (e.g., nodes 510a, b and d of FIG. 9) and measuring device 530's location based on the roundtrip time from the initiating signal to the receipt of the return signal, allowing for known time delays. According to one embodiment, the delay time may be built into reliable hardware having very little variability that may be installed in device 530. The hardware may be recognized by the monitoring or master node(s) that determine the associated time-delay. Once device 530 is located, according to one embodiment, its position is checked relative to the locations of virtual walls 560, 580, 570 and 620 that are stored in memory at the master node and/or monitoring node locations.

If it is determined at step 930 that the device is not within virtual walls (e.g., 560, 570, 580 and 620), the process moves to step 950 where requesting device 530 is denied access or, if connected, device 530 becomes disconnected in accordance with one embodiment of the present invention.

If it is determined at step 930 that device 530 is within virtual walls 560, 570, 580 and 620, the process moves to step 940 where device 530 requesting admission may be admitted and enumerated or, if device 530 is connected it may remain connected. It should be appreciated that, in addition to the virtual boundary check, additional protocols, e.g., a secure protocol requiring the exchange of a key, may also be employed to prevent device 530 within virtual walls 560, 570, 580 and 620 from obtaining unauthorized access to a wireless network. At this point the process exits flow diagram 900.

Figure 11:
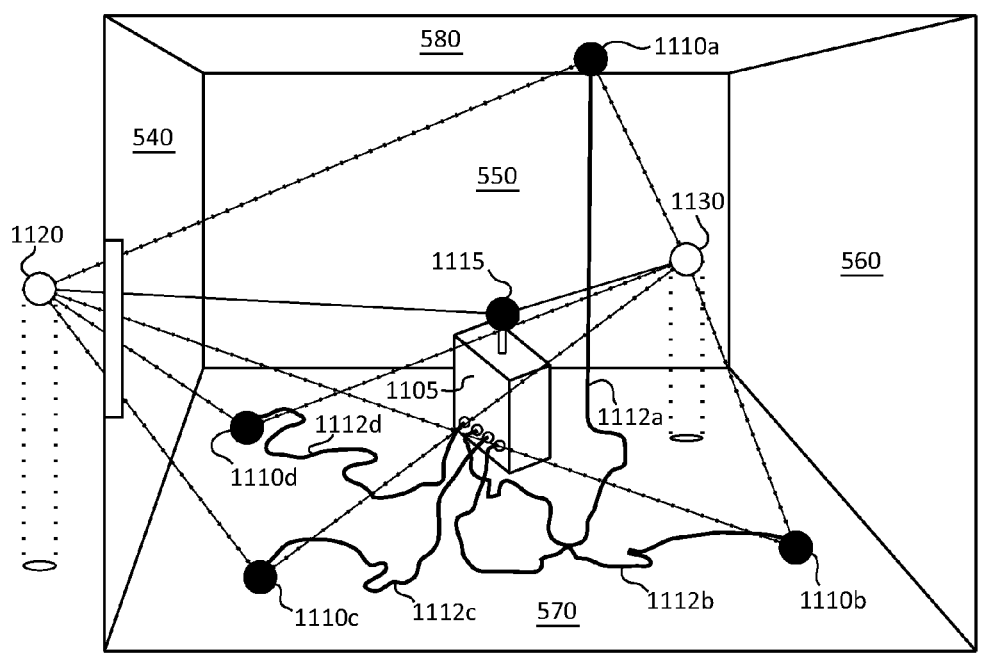
FIG. 11 is a diagram illustrating the placement of an authenticating device with multiple receivers configured to measure arrival time of signals to establish the location of a mobile transceiver in accordance with one embodiment.

FIG. 11 is a diagram 1100 illustrating the placement of an authenticating device 1105 with multiple receivers 1110a, 1110b, 1110c, and 1110d configured to measure arrival time of signals to establish the location of a mobile transceiver (e.g., 1120 or 1130) in accordance with one embodiment. Authenticating device 1105 relies on multiple receivers 1110a-d. Each receiver 1110a-d has associated hardware, which enables it to determine the relative arrival time of the RF signal from mobile device 1120 and/or 1130. A comparison of the arrival times from multiple receivers 1110a-d enables the authenticating device to determine the sender's location in three dimensions (3-space). To determine the full 3-D position of an object, four non-coplanar receivers will suffice. Three hyperbolic surfaces may be determined by taking three pairs of receivers in turn. The intersection of these three hyperbolic surfaces will denote the position of the device sending the RF signal. According to one embodiment, all outgoing ping signals are generated via antenna 1115 located on authentication device 1105. According to one embodiment there are, in addition to the transmitting antenna 1115, four coaxial cables 1112a, 1112b, 1112c and 1112d extending from authentication device 1105. At the end of each cable is a receiving device 1110a, 1110b, 1110c and 1110d. According to one embodiment, all four cables 1112a-d have equal lengths. The four receiving devices 1110a-d are then arranged so that no three receiving points are collinear, and all four are not coplanar. The ideal geometry occurs when the four receiving devices 1110a-d are at the vertexes of a regular tetrahedron.

Authenticating device 1105 of FIG. 11 may determine the location of a mobile transceiver device 1120 or 1130, according to one embodiment, by noting the relative arrival time of signals from the four receiving devices 1110a-d. Assuming that the location of the receiving devices 1110a-d has previously been laid out on a predefined 3-D grid, then the position of the two mobile transceivers 1120 and 1130 may be determined within the 3-D grid using mathematical techniques. Since all four coaxial cables 1112a-d have equal length, the location of the receiving antennas 1110a-d would not be expected to affect the delay incurred during the signal's transit through the cable. It should be appreciated that there are numerous arrangements that may be employed to afford precise timing information for the receipt of the signal at each receiver 1110a-d. In one embodiment coaxial cables 1112a-d may be dispensed with by allowing receivers 1110a-d to be independent devices that operate on a "wired" portion of the network. In this method each of the receiving devices 1110a-d has its own real-time clock which is synchronized to the others. In another embodiment, a central timing resource may be maintained that would broadcast the real-time to the receiving devices 1110a-d via identical equal length coaxial cables. In still another embodiment, one fixed location may be used for the transmitter and the four independent receivers 1110a-d may be synchronized by knowing the delays between the central transmitter and each receiver. This may be accomplished by positioning the receivers so that each is at the vertex of a regular tetrahedron and the transmitter is at the exact geometric center of the tetrahedron.

Still referring to FIG. 11, according to one embodiment mobile transceiver 1120 is located outside the intended virtual walls 540, 550, 560, 570, 580 and a transparent wall through which we view FIG. 11, while mobile transceiver 1130 is located inside. The location of the mobile transceiver 1120 or 1130 determines a unique set of four paths between it and the four receivers 1110a-d. The finite speed of light insures that the length of the path will affect the arrival time. The path-length to delay-time relationship is that for each additional foot added to a path there will be approximately one nanosecond of delay added.

In one embodiment, authenticating device 1105 of FIG. 11 will determine relative path delays via a real-time clock that has sub-nanosecond resolution. Authenticating device 1105 will take a snapshot of the clock and save the value of the real-time clock at some predetermined part the received signal packet. This will be done for all four receivers 1110a-d. Software will then make comparisons of the four values to determine the position of each mobile device 1120 and 1130.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of limiting access to a wireless network, said method comprising:
   a) forming a frame of reference by establishing a region delineated by at least three nodes configured to send and receive wireless signals to and from each other, comprising measuring distances between individual pairs of said at least three nodes, based on roundtrip times of said wireless signals to establish relative position information of said at least three nodes, and storing said relative position information in a memory location;
   b) based on said stored relative position information establishing said frame of reference, automatically deriving virtual boundary walls for said wireless network approximating intersecting physical walls in a structure in which said wireless network is housed, including measuring distances between each of said at least three nodes and individual ones of at least three positions of a mobile node based on roundtrip times of signals sent and received between said at least three nodes and said mobile node, and storing coordinates f at least three intersecting planes, each plane defined by the measured distance between said at least three nodes and one of said at least three positions of the mobile node, said at least three intersecting planes corresponding to said virtual boundary walls;
   c) in response to a wireless device seeking access, over an interface, to said wireless network, said at least three nodes sending ping signals to and receiving response signals from said wireless device over said interface to determine a location of said wireless device;
   d) determining whether said wireless device is within said wireless network virtual boundary walls based on said determined location of said wireless device and said stored coordinates defining said intersecting planes corresponding to said virtual boundary walls by:
      d1) determining a plurality of regions in which said device is possibly located based on distance to said at least three nodes determining from a time between said sending said ping signals and receiving said response signals in said c);
      d2) determining a location for said wireless device by forming an intersection of said plurality of regions; and
   e) automatically granting access to said wireless network if said wireless device is determined to be within said virtual boundary walls and whether said wireless device complies with a security protocol, and automatically denying access otherwise.

2. The method of claim 1 wherein said establishing a region further comprises subtracting out known delays from said roundtrip time of said wireless signals.

3. The method of claim 1 wherein said known delays comprise hardware-related delays recognized by at least one of said at least three nodes.

4. The method of claim 1 wherein said d) comprises determining a difference in arrival times of said response signal at each of said at least three nodes to determine a 3-space location of said wireless device with respect to said frame of reference.

5. The method of claim 1 wherein said at least three positions comprise a triangle, said triangle determining one of said plurality of planes.

6. The method of claim 1 wherein said determining whether said wireless device is within said virtual boundary walls comprises establishing coordinates of a location in space of said wireless device and comparing said coordinates of said location to said stored coordinates of said at least three intersecting planes.

7. A wireless network security system comprising:
   at least four monitoring nodes configured to receive signals;
   stored information defining a frame of reference including positions of said at least four monitoring nodes relative to each other;
   said at least four monitoring nodes together defining intersecting planes comprising virtual boundaries of a three-dimensional space; and
   an authentication device to respond to a wireless device seeking access to said wireless network, and to determine a location of said wireless device by measurements based on signals received by said at least four monitoring nodes from said wireless device, said authentication device compares the location of said wireless device to said stored information, and access to said wireless network is automatically granted when said location of said wireless device is determined by said authentication device to be within the virtual boundaries of said three-dimensional space defined by said intersecting planes and when said wireless device complies with a security protocol, and denied otherwise, wherein said authentication device is configured to determine a plurality of regions in which said wireless device is possibly located based in distances to said at least four nodes determined from a time between sending wireless signals to and receiving wireless response signals from said wireless device seeking access to said wireless network, and to determine a location for said wireless device by forming an intersection of said plurality of regions.

8. The wireless network security system of claim 7 wherein said stored information defining the frame of reference comprises distances between each of said at least four monitoring nodes.

9. The wireless network security system of claim 7 wherein three of said monitoring nodes are disposed in a triangular arrangement in a common plane, and a fourth monitoring node is disposed in a different plane.

10. The wireless network security system of claim 7 wherein at least one of said at least four monitoring nodes comprises a network server.

11. The wireless network security system of claim 7 wherein coordinates of said at least four nodes are stored in a memory location in a network server.

12. The wireless network security system of claim 7 wherein said at least four monitoring nodes are located at respective vertices of a tetrahedron.

13. The wireless network security system of claim 7 wherein said at least four monitoring nodes are configured to send the wireless signals to and receive the wireless signals from said wireless device seeking access to said wireless network.

14. The wireless network security system of claim 7 wherein said at least four monitoring nodes are configured to measure arrival times of signals received from a wireless device seeking access to said wireless network.

15. The wireless network security system of claim 7 wherein said intersecting planes define virtual boundaries of a structure in which said wireless network is housed.

16. A method of controlling access to a wireless network, said method comprising:
   a) in response to a wireless device seeking access, over an interface, to said wireless network, sending ping signals from at least four nodes configured to send and receive wireless signals, said at least four nodes forming a frame of reference defined by stored relative positional information of said at least four nodes, and receiving response signals from said wireless device over said interface to determine a location of said wireless device on the basis of said stored relative positional information of said at least four nodes, wherein determining the location of said wireless device further comprises:
      determining a plurality of regions in which said wireless device is possibly located based on distances to said at least four nodes determined from a time between sending wireless signals to and receiving wireless response signals from said wireless device, and
      determining a location for said wireless device by forming an intersection of said plurality of regions;
   b) determining whether said wireless device is within boundaries of said wireless network based on said determined location of said wireless device and stored coordinates of intersecting planes defining virtual boundaries of a three-dimensional space in a structure in which said wireless network is housed; and
   c) automatically granting access to said wireless network when said wireless device is determined to be within said three-dimensional space and when said wireless device complies with a security protocol, and automatically denying access otherwise.

17. The method of claim 16 wherein there are four monitoring nodes, three of said monitoring nodes located in a common plane and a fourth monitoring node located in a different plane.

18. The method of claim 17, said three monitoring nodes located in a triangular arrangement.

19. The method of claim 16, said at least four monitoring nodes located at respective vertices of tetrahedron.

* * * * *